United States Patent [19]
Inamoto

[11] Patent Number: 6,049,891
[45] Date of Patent: Apr. 11, 2000

[54] DATA ACCESS CONTROL SYSTEM AND COMPUTER-READABLE MEDIUM STORING DATA ACCESS CONTROL PROGRAM

[75] Inventor: Yasushi Inamoto, Kawasaki, Japan

[73] Assignee: Fujitsu Limited, Kawasaki, Japan

[21] Appl. No.: 09/040,994

[22] Filed: Mar. 19, 1998

[30] Foreign Application Priority Data

Oct. 20, 1997 [JP] Japan ................................ 9-287372

[51] Int. Cl.[7] ................................................ G06F 13/14
[52] U.S. Cl. ........................ 714/6; 707/102; 710/25; 710/45
[58] Field of Search .................. 714/6, 7, 8, 5; 707/100, 101, 102, 103, 104; 710/5, 6, 25, 29, 39, 45; 711/167

[56] References Cited

U.S. PATENT DOCUMENTS

| | | | |
|---|---|---|---|
| 5,473,362 | 12/1995 | Fitzgerald et al. | 348/7 |
| 5,473,753 | 12/1995 | Wells et al. | 714/5 |
| 5,535,197 | 7/1996 | Cotton | 370/414 |
| 5,577,194 | 11/1996 | Wells et al. | 714/8 |
| 5,867,657 | 2/1999 | Bolosky et al. | 370/230 |
| 5,938,734 | 8/1999 | Yao et al. | 709/232 |
| 5,956,321 | 9/1999 | Yao et al. | 709/219 |

*Primary Examiner*—Robert W. Beausoliel, Jr.
*Assistant Examiner*—Christopher A Revak
*Attorney, Agent, or Firm*—Staas & Halsey

[57] ABSTRACT

A data access control system for reading/writing data from/to an array of storage units, which is resilient to read/writing errors to avoid lost data, while meeting the realtime requirements. Consecutive data blocks are stored in a plurality of storage units in a distributed manner by using a striping technique. A time slot vacancy monitor checks the present activities of the storage units to find a vacant time slot during which no data read/write operations are scheduled. A data read/write controller finds a particular data block that is scheduled to be read out of/written the storage units just after the vacant time slot has expired. When such a data block is found, the data read/write controller prefetches that data block during the vacant time slot. If a read/write error is encountered during the prefetch of the data block, the data read/write controller attempts read/write retry operations in the remaining period of the vacant time slot until the scheduled data output time comes. This read/write retry operation will be repeated, if necessary, within the limited time period.

10 Claims, 12 Drawing Sheets

DATA ACCESS CONTROL SYSTEM AND COMPUTER-READABLE MEDIUM STORING DATA ACCESS CONTROL PROGRAM

BACKGROUND OF THE INVENTION

1. Field of the Invention

The present invention relates to data access control systems for reading and writing data from/to mass storage devices such as magnetic disks, as well as to computer-readable media encoded with a data access control program. The present invention relates more particularly to a data access control system which reads and writes data while meeting the requirements of realtime applications, and to a computer-readable medium encoded with a data access control program designed to provide such functionalities.

2. Description of the Related Art

The primary function of video servers, computer equipment designed for video-on-demand services, is to read out a large amount of data from magnetic disk storage and deliver it to a plurality of client terminals, while ensuring realtime reconstruction of visual information at the receiving ends. To realize this function, video servers are required to have a special mechanism to read data from disk storage at a high speed.

Consider, for example, an MPEG-2 (the second-phase standard of Motion Picture Experts Group) video stream with a bitrate of 6.144 Mb/s (megabit per second). To concurrently output fourteen such streams, the video server must provide the total data transfer rate of about 86 Mb/s, or about 10.8 MB/s (megabyte per second). However, even with the latest storage technologies, a single disk drive can only provide an average sustained data transfer rate of 4 MB/s to 5 MB/s. Furthermore, each video data cannot be stored in a disk as a single continuous data stream, but has to be stored as a collection of small blocks, so that the blocks of different streams will be sequentially read out at equal bitrates. This data segmentation, however, causes frequent seek and wait operations in the sequential disk access, which can be another significant factor to lower the system's average throughput.

Taking the above problems into consideration, most video servers employ not a single disk drive, but a plurality of disk drives, or a disk array. All the video streams, being divided into a plurality of data blocks, are distributed across different disks in a prescribed sequence, with a technique known as "striping." Here, all the disk drives are connected on a single data bus. The data blocks read out of the disks is once transferred from a disk interface circuit to a buffer memory for temporary storage and then delivered to the clients through a network interface, while the data flow of each individual video stream is regulated so as to keep a constant data transfer rate required.

FIG. 12 shows how the data is read out from five disk drives and transferred through the data bus. Here, data access and transfer operations occurring in the individual disks are illustrated in the form of horizontal bars, where each shaded portion represents a period "a" that is spent for reading data from a disk. Every disk access involves seek, wait, and data read operations. "Seek" operation is to position the read/write heads on the desired track, and "wait" operation is to remain idle until the platter rotates and the desired sector comes under the heads. "Data read" operation is to read data recorded on the platter and transfer it to the drive's local cache memory. The period "a" in FIG. 12 represents the total time of these three operations, and the present description will use the term "data read operation" to refer to the three operations collectively, unless otherwise noted. Also in FIG. 12, the crosshatched part of each bar represents a data bus transfer time "b" which is required to transfer data from the local cache memory to the data bus.

Since the video server is designed to read video data through a common data bus, it is not allowed for the disk drives to place their outputs simultaneously on the same bus. To efficiently use the limited data bus bandwidth, the disk access is totally scheduled so that the drives will output data with different timing offsets. In this scheduled disk access, one drive sends its read data to the data bus while other drives are performing their respective data read operations (i.e., seeking tracks, waiting platter spins, and reading data). In this way, the above-described disk array system promises better performance than a single drive system, with respect to the average sustained data transfer rates.

Consider, for example, that a plurality of disk drives each providing average sustained data transfer rate of 4 MB/s, maximum seek time of 17 ms, and maximum disk latency of 8.3 ms are used to store an MPEG-2 compressed video stream with a bitrate of 6.144 Mb/s. The data is striped over such drives in such a way that each block contains a piece of video information for half a second, which is equal to 384 KB (6.144 Mb/s×0.5 s=3.072 megabits=384 kilobytes). To interface with the disk drives, the system employs a Wide-Fast SCSI bus, which is the 16-bit expanded version of the Small Computer System Interface (SCSI) bus enhanced for high-speed data transfer. Since this standard bus provides a data transfer rate of 20 MB/s, the periods a and b shown in FIG. 12 are calculated as $$a = 17 + 8.3 + (384/4) + \text{(overhead)} \quad (1)$$
$$\cong 140 \text{ [ms]}$$

$$b = (384/20) + \text{(overhead)} \quad (2)$$
$$\cong 35 \text{ [ms]},$$

where the term "overhead" is the time required for the data bus to convey the control messages, including commands sent from disk interface to disk drives and responses returned from disk drives to disk interface. In the present example, each disk drive provides an average sustained throughput of $$384 \, KB/(140 \, ms+35 \, ms) \cong 2.2 \, MB/s \quad (3)$$

Accordingly, the five disk drives will exhibit an overall data transfer rate of 11.0 MB/s (i.e., 2.2 MB/s×5). This yields the maximum number of streams as $$11.0 \times 8/6.144 = 14.3, \quad (4)$$

which means that the video server can deliver up to fourteen concurrent video streams, each with a bitrate of 6.144 Mb/s.

In real life, however, bit errors inevitably happen during the disk read cycles. Therefore, most disk storage systems are designed to execute read retry operations, when they encountered a read error during the disk access, until the correct data is obtained. If the data has been successfully read out, the system completes the cycle as a normal end. On the other hand, if a predetermined number of read retry operations have ended up in vain, the system terminates the read cycle, taking it as a true read error. Since, each typical read retry operation needs one extra spin of disk media, or platters, it takes 8.3 ms for the system to retry a read access to the aforementioned disk drives, which equals the maximum latency of the disks.

In order to meet the realtime requirements in the heaviest load conditions (e.g., when supplying a maximum number of streams), conventional video servers have introduced the concept of time slots into their basic design. More specifically, a time slot is defined to be a fixed period of (a+b) shown in FIG. 12, and every disk access is scheduled on the basis of the time slots. The disk drives are controlled to finish both data read and bus transfer operations for every data block within the limited period of a time slot.

Such a disk array will exhibit its maximum performance as a whole when all individual disk drives produce their maximum throughput as shown in the timing diagram of FIG. 12. This design, however, spares no time for making a read retry operation to recover from read errors. A read error, if happened in a data read operation, directly cause an abnormal end of that session, resulting in the complete lack of that data block. This leads, for example, to a blackout for half a second at the clients' monitor screens.

One obvious method to avoid this problem is to introduce some timing margin in the time slot design to allow for read retry operations. To make M cycles of read retry operations possible, the time slot interval should be at least a sum of the time (a+b) shown in FIG. 12 and the time required for M turns of disk spins (e.g., 8.3 ms×M in the aforementioned example). However, in comparison with the design allowing no read retries, this method degrades the server's maximum throughput. More specifically, the maximum number of concurrent streams in the present example is calculated as follows. When M=1, $$384/(140+35+8.3\times1)\times5 \cong 10.5 \; [MB/s] \; 10.5\times8/6.144=13.6 \rightarrow 13 \; [\text{stream}] \quad (5)$$

When M=2, $$384/(140+35+8.3\times2)\times5 \cong 10.0 \; [MB/s] \; 10.0\times8/6.144=13.0 \rightarrow 13 \; [\text{stream}] \quad (6)$$

When M=3, $$384/(140+35+8.3\times3)\times5 \cong 9.6 \; [MB/s] \; 9.6\times8/6.144=12.5 \rightarrow 12 \; [\text{stream}] \quad (7)$$

As such, the video server is no longer capable of sending fourteen concurrent video streams at a bitrate of 6.144 Mb/s.

In actual video-on-demand systems, however, video servers are rarely required to show their maximum throughputs on a constant basis. When few clients are requesting services, the number of video streams produced by the video server will be naturally reduced. Regardless of this, however, conventional video servers still have to maintain the principle of "a single block read within a single time slot" in their disk access, because of their basic design concept. Therefore, the conventional servers do not retry the disk access to recover from read errors even in such a situation where only a few streams are in service and thus the drives have much time to spare.

The problems discussed above are not peculiar to data read operations, but also applicable to data write operations that stripe data across a plurality of disk drives to meet the requirements of realtime applications. Being designed to finish the data bus transfer and disk write operations in a fixed time slot, the conventional servers are unable to rewrite data to recover from write errors, even when the number of streams in session has not reached the maximum capacity.

SUMMARY OF THE INVENTION

Taking the above into consideration, an object of the present invention is to provide a data access control system for reading out data from storage units, which is resilient to read errors to avoid lost data, while meeting the requirements of realtime applications.

Another object of the present invention is to provide a data access control system for writing data into storage units, which is resilient to write errors to avoid lost data, while meeting the requirements of realtime applications.

To accomplish the first object, according to the present invention, there is provided a data access control system for sequentially reading out a plurality of data blocks from a plurality of storage units, and for transferring each data block through a single data transmission channel within a scheduled output time period, wherein the plurality of storage units are disposed on the single data transmission channel to store the plurality of data blocks in a distributed manner. This data access control system comprises a time slot vacancy monitor and a data read controller. The time slot vacancy monitor finds a vacant time slot available in each of the storage units. Here, the vacant time slot is a time period during which no data read operations are scheduled. The data read controller finds a particular data block that is scheduled to be read out of the storage units just after the vacant time slot has expired. When such a data block is found, the data read controller prefetches the particular data block during the vacant time slot. If a read error is encountered during the prefetch of the particular data block, it executes read retry operations until the scheduled output time period comes.

To accomplish the second object, according to the present invention, there is provided a data access control system for transferring a plurality of data blocks to a plurality of storage units through a single data transmission channel, each within a scheduled time period, and sequentially writing the transferred data blocks into the plurality of storage units. The plurality of storage units are disposed on the single data transmission channel to allow the plurality of data blocks to be stored in a distributed manner. This data access control system comprises a time slot vacancy monitor and a data write controller. The time slot vacancy monitor finds a vacant time slot available in each of the storage units. The vacant time slot is a time period during which no data write operations are scheduled. The data write controller finds a particular data block that is scheduled to be written into the storage unit of interest just before the vacant time slot detected by the time slot vacancy monitor begins. It executes write retry operations during the vacant time slot if a write error is encountered when writing the particular data block.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Several preferred embodiments of the present invention will be described below with reference to the accompanying drawings.

Figure 1:
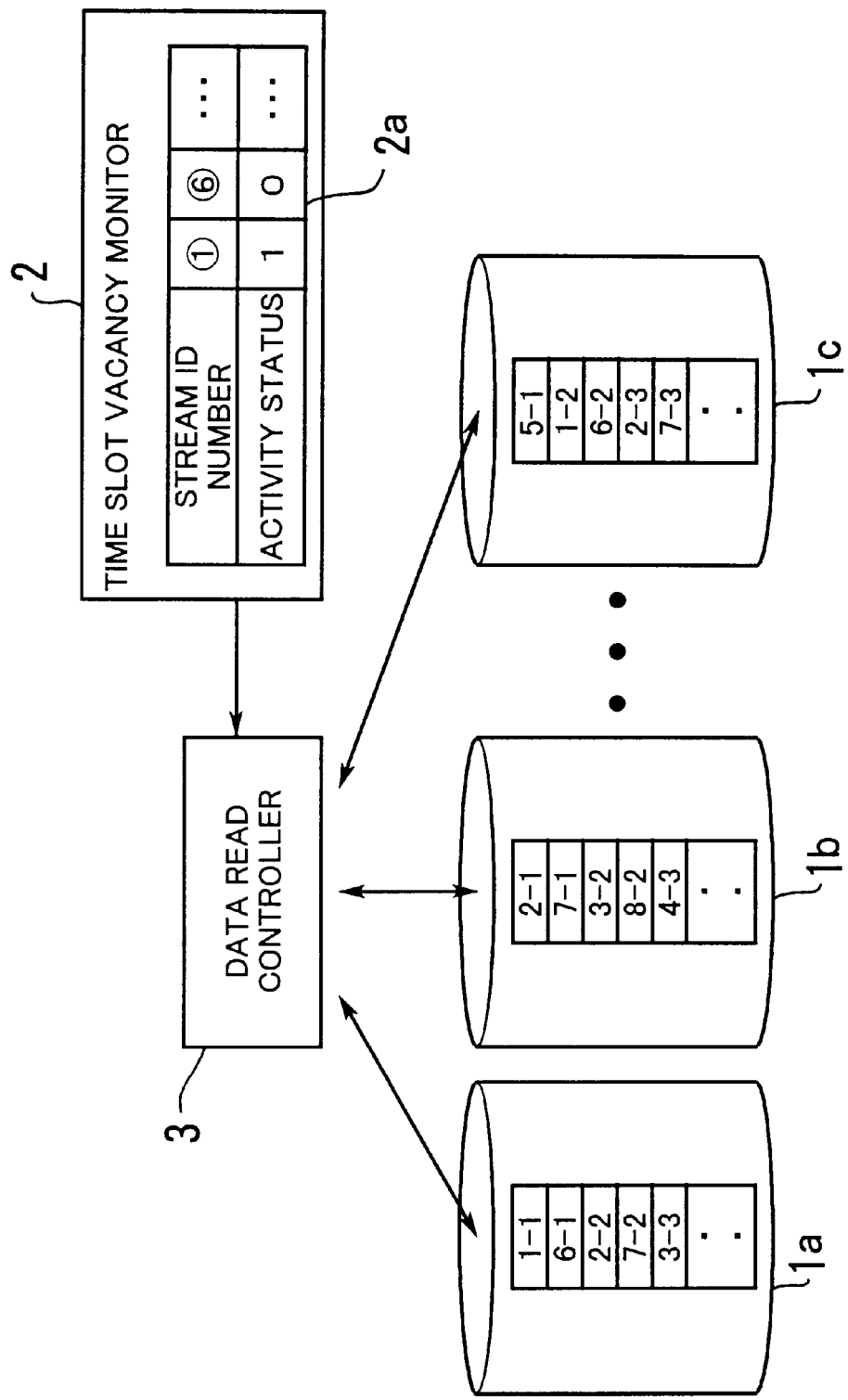
FIG. 1 is a conceptual view of the present invention.

FIG. 1 is the conceptual view of a data access controller proposed as a first embodiment of the present invention. This controller comprises an array of storage units 1a to 1c disposed on a single data transmission channel (not illustrated). Data files are stored in these storage units 1a to 1c in a distributed manner, while being divided into small data blocks. In other words, the data is striped across the plurality of drives. This striping involves writing the data blocks sequentially from one disk to another.

The data access controller of the first embodiment further comprises a time slot vacancy monitor 2 and a data read controller 3. The time slot vacancy monitor 2 finds vacant time slots during which no data read operations are scheduled in each of the storage units 1a to 1c. More specifically, the time axis is divided into short slots whose interval is equal to the time required to read one data block from the storage units 1a to 1c. Further, the time slot vacancy monitor 2 defines a "stream" as a resource allocated for making access to a specific series of data blocks. More specifically, the above time slots are assigned to a plurality of streams that can be activated concurrently. This slot allocation is made before the system starts the service for a specific stream.

At the beginning of each time slot, the time slot vacancy monitor 2 checks the activity status of a stream corresponding to that time slot, referring to a stream activity status table 2a. This stream activity status table 2a contains information as to whether each individual stream is active or not. As FIG. 1 shows, the entries of the stream activity status table 2a are arranged in the order of time slots, and each entry consists of the identification (ID) number of the stream assigned thereto and a flag indicating whether the stream is active or inactive. Thus, the flags are referred to as the "activity status flags." If a specific stream of interest is inactive, the controller makes a forward search over the stream activity status table 2a until any active stream is found. By counting the columns skipped in this search, the time slot vacancy monitor 2 obtains the number of consecutive time slots that are vacant. The time slot interval multiplied by the number of consecutive vacant time slots represents the time available for other usage, which is called a "maximum permissible period" for retry operations.

Using the vacant time slots, the data read controller 3 first prefetches a data block for the next active time slot from the storage units 1a to 1c. This data block is referred to as a "prefetched data block." In the event that a read error is encountered during the prefetch, the data read controller 3 will attempt to read out the missing part of the same data block again within the remaining time before the scheduled data output time comes. Actually, this read retry operation is repeated as many times as possible within the maximum permissible period calculated above.

In this way, the data access controller of the first embodiment prefetches a data block for the next active stream when a vacant time slot is available. Even if a read error is encountered, the controller performs read retry operations repetitively within a limited time period before the scheduled data output time. Accordingly, the system becomes resilient to read errors, allowing the data to be recovered in whole or in part.

The concept of the present invention described above can be implemented in a video server system as will be discussed in the following section.

Figure 2:
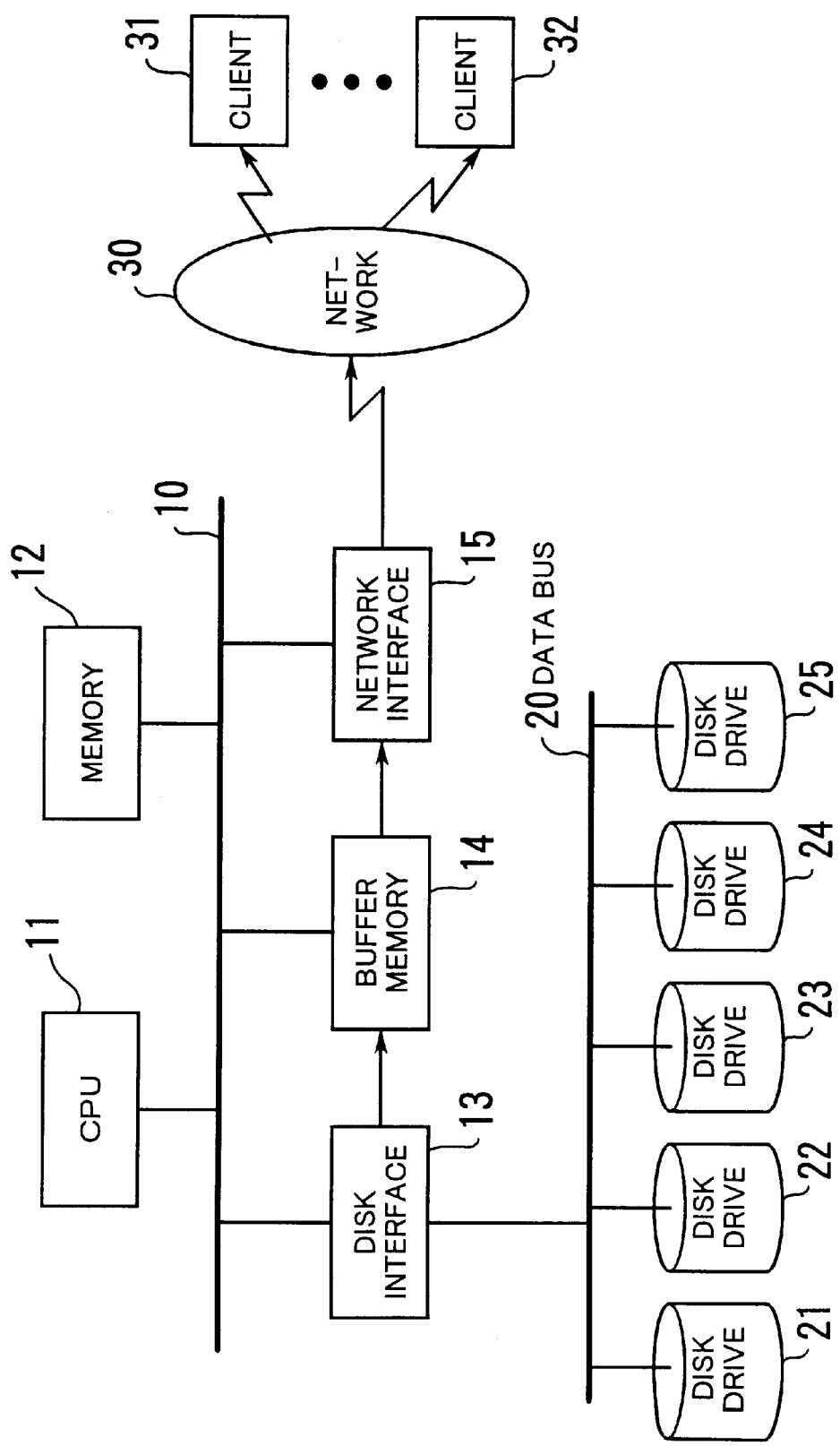
FIG. 2 is a diagram which shows a typical configuration of a video server system.

FIG. 2 shows a typical configuration of a video server system, which provides up to fourteen users with video programs stored in five disk drives 21 to 25. That is, the maximum number of streams that this system supports is fourteen.

The video server system comprises a central processing unit (CPU) 11 and a memory 12, which control a disk interface 13, a buffer memory 14, and a network interface 15 through a system bus 10. Besides serving as temporary storage for the executive programs of the CPU 11 and other data, the memory 12 stores a stream activity status table 40 that shows which streams are currently in service.

Figure 3:
FIG. 3 is a diagram which shows a typical stream activity status table.

FIG. 3 illustrates a typical configuration of this stream activity status table 40. The stream activity status table 40 contains as many entries as the maximum number of streams, each of which consists of a stream ID number (from #1 to #14) and a corresponding stream status flag that indicates whether the stream is active ("1") or inactive ("0"). Such table entries are arranged in the order that the corresponding data blocks are transmitted to a data bus 20 when all the streams are activated.

Referring back to FIG. 2, the disk interface 13 transfers data to/from the disk drives 21 to 25 by issuing access requests through the data bus 20. In the present system, the disk access begins at the disk drive 21, continues in ascending order of their reference numerals (i.e., 22, 23, 24, and then 25), and repeats from the first disk drive 21. The data bus 20 actually conforms to the SCSI or SCSI-2 bus standard.

The buffer memory 14 temporarily stores the data that the disk interface 13 has received from the disk drives 21 to 25. The network interface 15 reads out this data from the buffer memory 14 and delivers it to clients 31 to 32 over a network 30.

A plurality of video data files are distributed across the disk drives 21 to 25 by striping, a technique for storing blocks of data on different drives. The block size is determined so that each data block can be transmitted within a single time slot. In the present example, five disk drives 21 to 25 have their respective drive identification (ID) numbers, #1 to #5, to distinguish themselves from each other. Here, the drive ID numbers are natural numbers which start from #1 and increase up to the number of available drives. The data read operations are initiated, one by one, in ascending order of the drive ID numbers, and when the operation has reached the last drive, it then wraps around to the first drive #1. The wording "next disk drive," which will appear in later sections, refers to the above order of disk drives.

Figure 4:
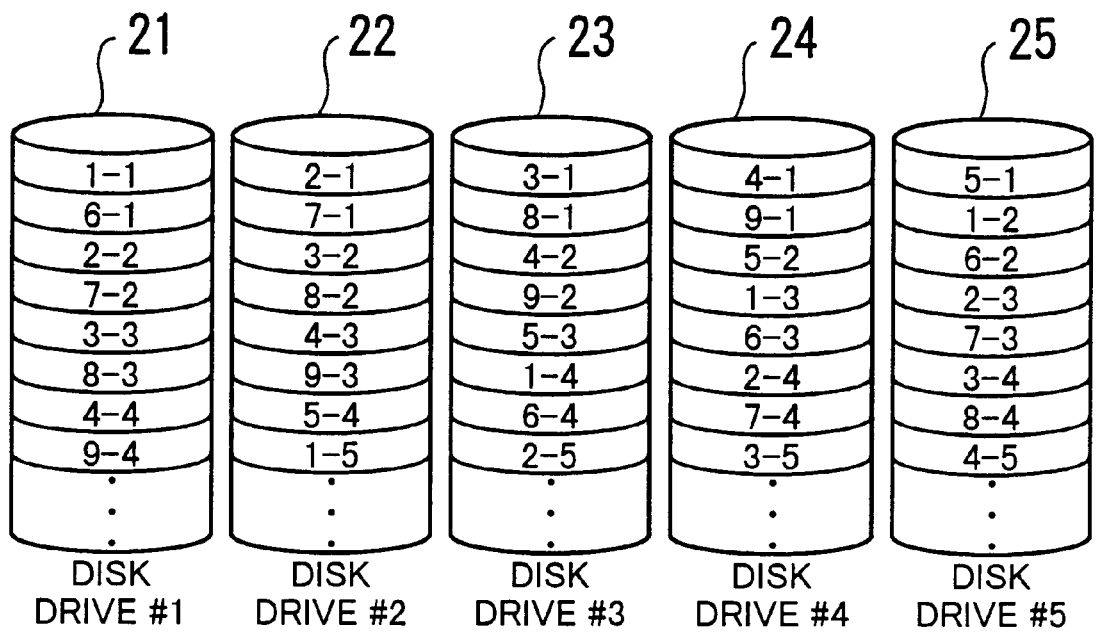
FIG. 4 is a diagram which illustrates how the data is stored in a disk array.

FIG. 4 illustrates how the video data is stored in the disk array. In the present example, nine video data files are striped over the five disk drives 21 to 25. FIG. 4 names each data block by a combination of two numerals (e.g., "2–3"), where the first numeral indicates a specific file and the second numeral represents a specific data block of that file. For instance, the symbol "2–3" represents the third data block of the second file. Data blocks of each file are not concentrated in a single disk drive, but distributed equally on a plurality of disk drives. Take the first video data file for example. Its data blocks are stored in such a sequence as: "disk drive #1," "disk drive #5," "disk drive #4," "disk drive #3," "disk drive #2," "disk drive #1," and so on. The other files also follow this sequence, although their starting points may be different from each other.

Now, suppose that a client has requested the above-described video server system to deliver a specific video program. In response to this, the video server system allocates a stream to the requesting client. The stream has a specific time slot assigned beforehand for making access to the disk drives to read out the relevant video file requested by the client. As FIG. 4 illustrates, the data blocks are striped across different disk drives in the aforementioned order (i.e., #1, #5, #4, #3, #2, #1, . . . ), and therefore the time slots are arranged so that the data blocks of each stream will be retrieved from the disk drives in the same sequence as the above.

The disk interface 13 sends the data blocks read out of the disk drives to the buffer memory 14 for temporary storage. The network interface 15 then transfers them to the network 30, controlling each stream's transmission rate at a constant level. In this way, the requested video program are delivered to the clients 31 to 32.

Figure 5:
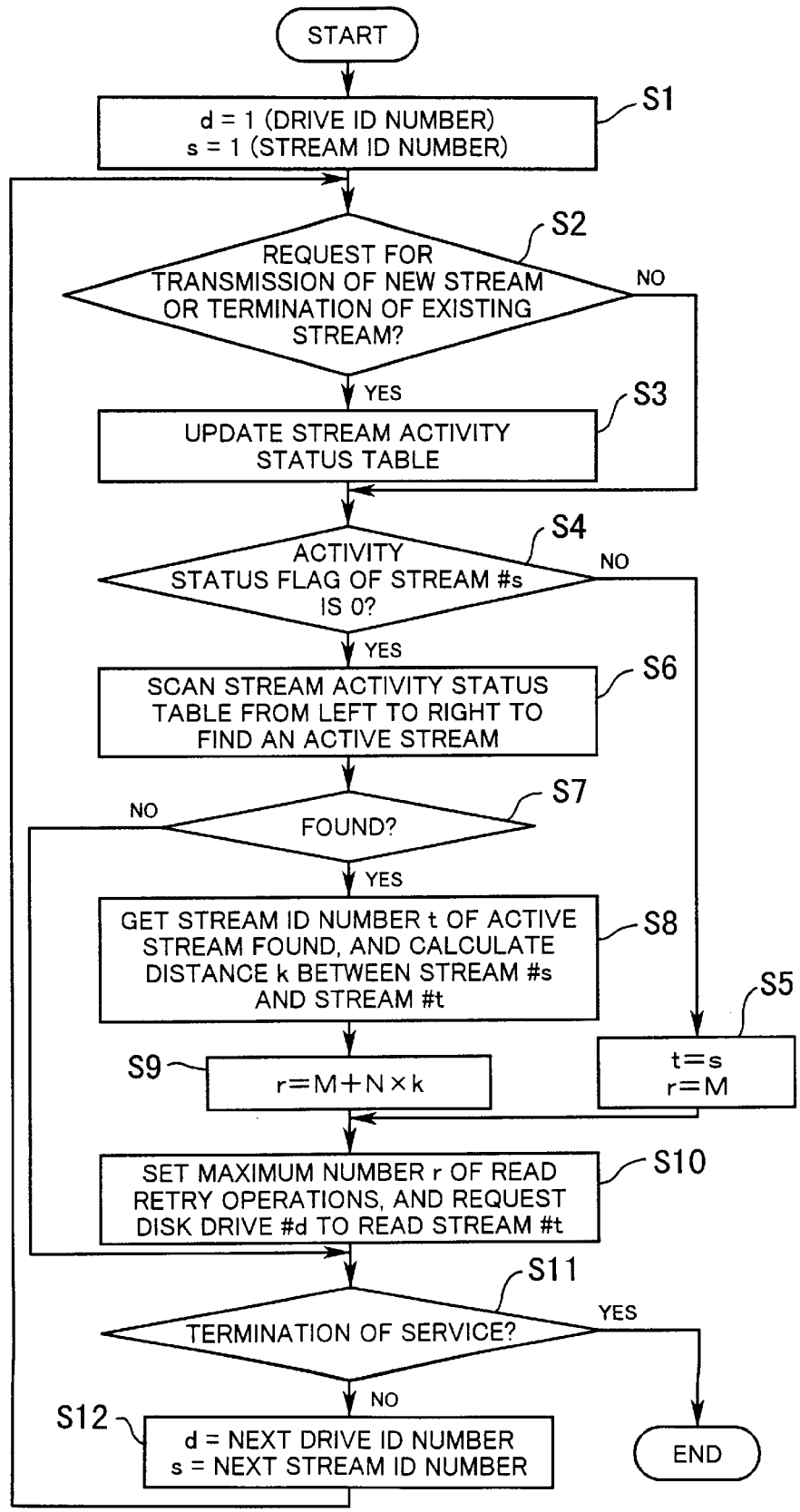
FIG. 5 is a flowchart which shows a process of reading data from disk drives.

The next section will clarify the details of data read operations, referring to a flowchart of FIG. 5, which shows a process of reading data out of the disk drives 21 to 25. This process is executed by the CPU 11 according to an appropriate control program loaded into the memory 12, as will be described below in steps S1 to S12.

(S1) The process first gives an initial value of "1" to a parameter named "d" that represents the identification number of a specific disk drive, as well as setting the same value "1" to another parameter named "s" that indicates the identification number of a specific stream to be processed.

(S2) It is examined whether there is a request for transmission of a new stream #s or termination of the existing stream #s. If such request is present, the process advances to step S3. Otherwise, it skips to step S4.

(S3) The CPU 11 updates the contents of the stream activity status table according to the request. More specifically, when the transmission of a new stream is requested, a stream status flag corresponding to the stream #s will be set to "1." When the termination of the existing stream #s is requested, the corresponding stream activity status flag is reset to "0."

(S4) Referring to the stream activity status table, the CPU 11 checks whether the stream status flag of the stream #s is "0" or not. If the flag is "0," the process proceeds to step S6. If it is "1," then the process advances to step S5.

(S5) Now that the stream #s has turned out to be active, two new variables are introduced as t=s and r=M, where M is a constant described later on. The process then advances to step S10.

(S6) The CPU 11 scans the stream activity status table 40 from left to right to find a stream whose stream status flag is set to "1." Suppose, for instance, that the present value of s is 6 (i.e., the stream #6 is in process). The CPU 11 starts scanning from the second column (stream #6) of the stream activity status table 40 and then continues examining the next ones (streams #11, #2, etc.), while changing its scanning pointer from column to column, until it finds an active stream having a status flag value of "1." When it has reached the right-most column of the stream activity status table, the pointer wraps around to the left-most column to continue the scan. In the present example of FIG. 3, the CPU 11 identifies the stream #2 as the next active stream. The scanning operation of step S6, however, may fail to find a stream with a status flag value of "1" in the table, which happens when there are no active streams at all.

(S7) It is judged whether the next active stream has been found or not. If it has been found, the process advances to step S8. Otherwise, the process skips to step S11.

(S8) The stream identification (ID) number of the active stream found in step S6 is assigned to a variable "t," and a new parameter "k" representing the distance between the stream #s and stream #t is calculated in terms of the number of columns in the stream activity status table. In the example of FIG. 3, the distance between the stream #6 and the stream #2 is two.

(S9) The CPU 11 calculates the value of (M+N×k) and assigns the result to another variable "r." Here, M and N are constant values described later.

(S10) The CPU 11 issues a read request command to the disk drive #d to read a data block of the stream #t, while allowing r cycles of read retry operations at maximum.

(S11) It is examined whether the termination of service is requested or not. If there is such a request, the process aborts at that point in time, and otherwise, the process advances to the next step S12.

(S12) The variables d and s, which represent the present drive ID number and the present stream ID number, respectively, are updated so that they will point the next disk drive and the next stream. The process now returns to step S2.

In this way, the video server system according to the present invention searches for vacant time slots and reserves them, if any, for read retry operations. Unlike conventional systems, which are unable to recover from read errors, the proposed system will attempt to read the missing part again, thereby making it more likely that the required data block is successfully read out of the disk drives.

The constant M appeared in steps S5 and S9 is the number of read retry operations that can be conducted within a single time slot excluding the seek time, latency, data read time, and data bus transfer time. To maximize the number of concurrent streams that the system can supply, M should be set to zero. On the other hand, to spare the time for read retry, a positive value should be given to M.

Another constant N appeared above is the number of read retry operations that can be conducted within a single vacant time slot. This N is obtained by $$N=[(a+b)/(\text{read retry cycle time})], \tag{8}$$

where a is the sum of seek time, latency, and data read time, b is data bus transfer time (i.e., the time required for transferring data from internal cache to data bus), and [X] represents the largest integer that does not exceed a real number X. The read retry cycle time nearly equals the maximum latency in disk drive access. Recall, for example, the disk drive mentioned in the Description of the Related Art, whose maximum seek time was 17 ms and maximum latency was 8.3 ms. When an MPEG-2 video data for half a second is read out from this disk drive, the value of N is obtained as follows by adapting Equations (1) and (2).

$$N = [(140\ ms + 35\ ms)/8.3\ ms] = 21 \qquad (9)$$

Now, the following section will present the contrast between a conventional system and the system proposed in the present invention, referring to timing diagrams illustrating data transfer operations in the two systems.

Figure 6:
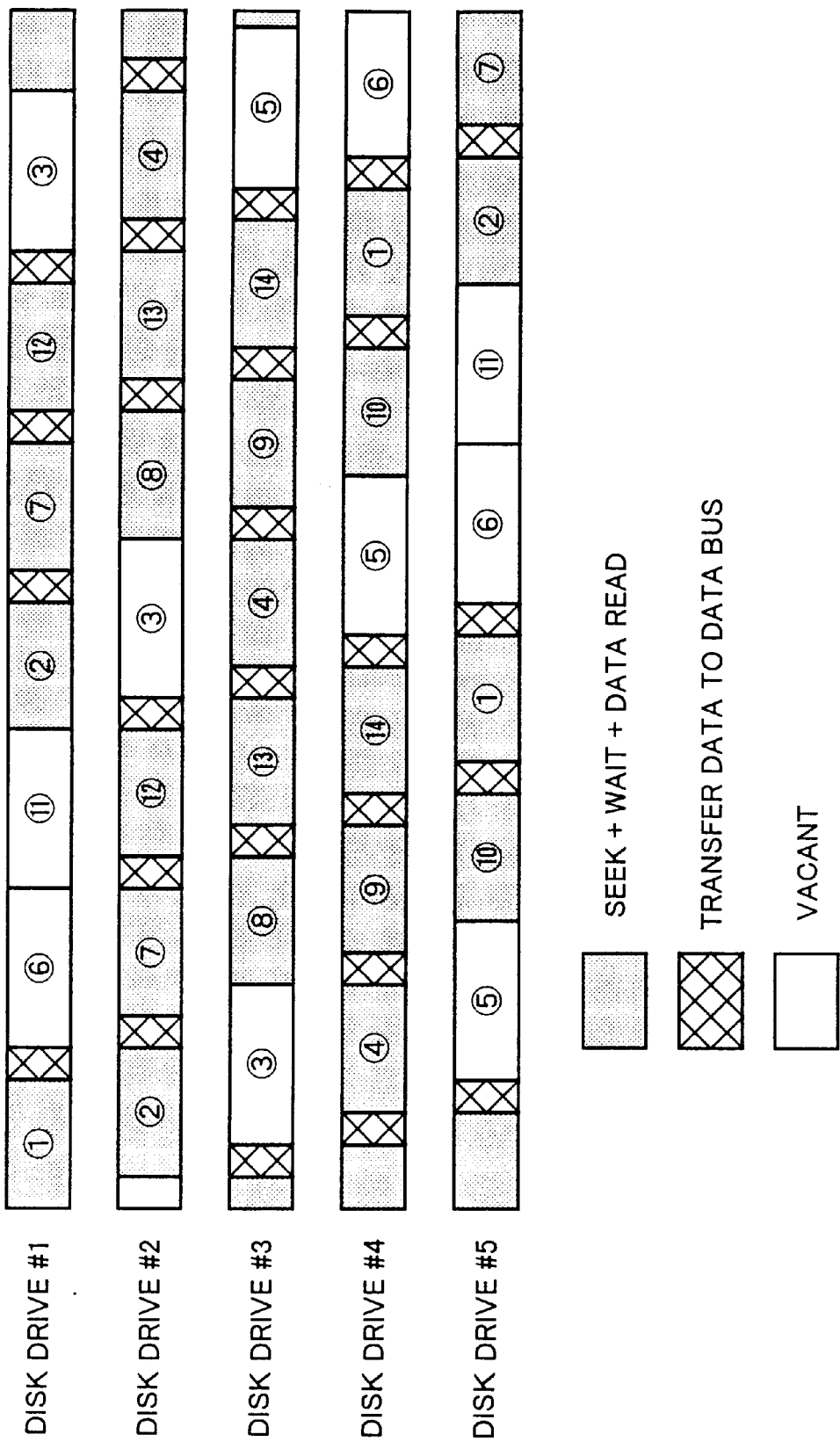
FIG. 6 is a timing diagram which shows conventional data read operations.

FIG. 6 is a timing diagram which shows conventional data read operations, where the number of activated data streams is below the maximum and some time slots remain unused. Concerning the legend of FIG. 6, the circled numerals represent the stream ID numbers assigned to fourteen streams, the largest number of concurrent data streams that the present system can produce. The shaded portions represent the period of seek, wait, and data read operations, while the crosshatched portions indicate the data bus transfer time required for transferring data from each drive's local cache to the common data bus. Further, the blank time slots show that they are just vacant and have no data to output. In the present example, the streams #3, #5, #6, and #11 have no assignment.

Figure 7:
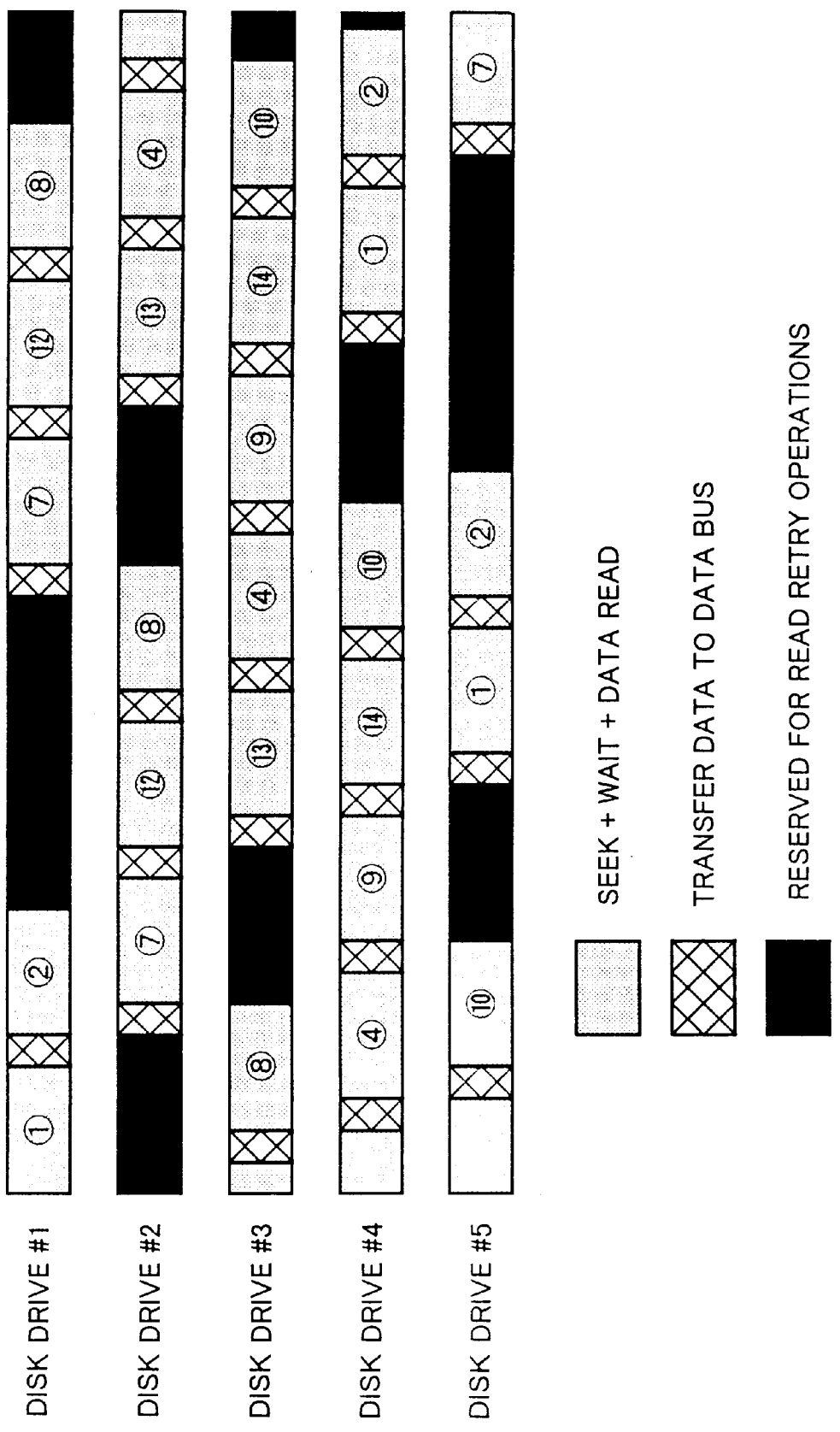
FIG. 7 is a timing diagram showing data read operations according to the present invention.

FIG. 7 is a timing diagram which shows the data read operations according to the present invention. The black portions represent the periods reserved for read retry operations. Maintaining the same legend as that of FIG. 6 concerning the other types of slots, FIG. 7 illustrates like active streams including #1, #2, #4, #7 to #10, and #12 to #14.

Compare the time slot #8 (more exactly, the time slot of stream #8) in FIG. 7 with that in FIG. 6. It should be noted here that the time slot #3 just before the time slot #8 is not used at present, and therefore the data read operation for the time slot #8 can start at the beginning of the time slot #3. In this situation, the disk read cycle can start earlier with no risk, as long as the read data can be transferred to the data bus 20 in its scheduled output time. Therefore, with respect to the time slot #8, it is possible to make a disk read operation one slot interval earlier than usual, and use the remaining slot time for read retry operations, if necessary. This applies also to other time slots #2 and #10, and particularly in the former case, it is possible to spend two full slot intervals, at the maximum, for retrying data read operations.

Note that the scope of the first embodiment is such a system that reads out data from disk storage and delivers it to remote clients over a network. This is why the data "read" operations, "read" errors, and "read" retry cycles have been discussed as the primary interest.

The concept of the present invention, however, is not restricted to "reading," but can be extended to "writing" data into disks. The next section will introduce a second embodiment of the present invention to discuss the data "write" operations, "write" errors, and "write" retry (or rewrite) cycles. For illustrative purposes, it will take a video surveillance system, in which the capability of realtime data recording is essential.

Figure 8:
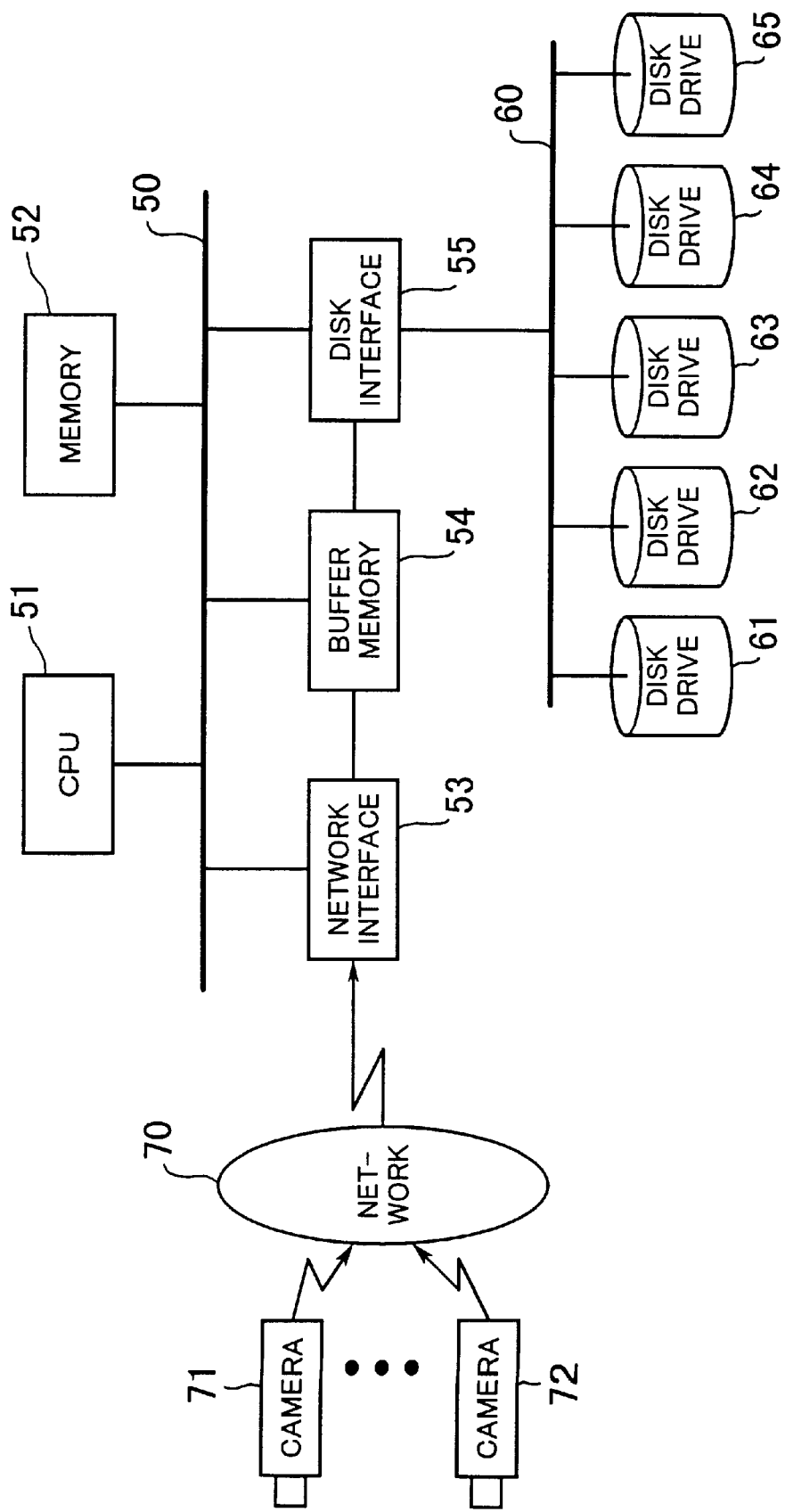
FIG. 8 is a diagram which shows an example of a video monitoring system.

FIG. 8 is a block diagram of a video surveillance system, which is presented as the second embodiment of the present invention. This system comprises a plurality of video cameras 71 to 72 to provide video data to a video storage subsystem via a network 70. The video storage subsystem employs a CPU 51 and a memory 52 to control a network interface 53, a buffer memory 54, and a disk interface 55 through a system bus 50. Besides serving as storage for the executive program of the CPU 51, the memory 52 holds a stream activity status table. The network interface 53 receives the video data sent over the network 70 and supplies it to the buffer memory 54. The buffer memory 54 temporarily stores the video data supplied from the network interface 53. Through a data bus 60, the disk interface 55 writes the data to an array of disk drives 61 to 65, in which a sufficient amount of disk space is reserved for a plurality of striped video data streams.

In operation of this video surveillance system, the video data captured by the cameras 71 to 72 is continuously delivered to the network interface 53 via the network 70. The video data received by the network interface 53 is saved into the buffer memory 54, and then striped across the disk drives 61 to 65 by the disk interface 55 under the control of the CPU 51.

Figure 9:
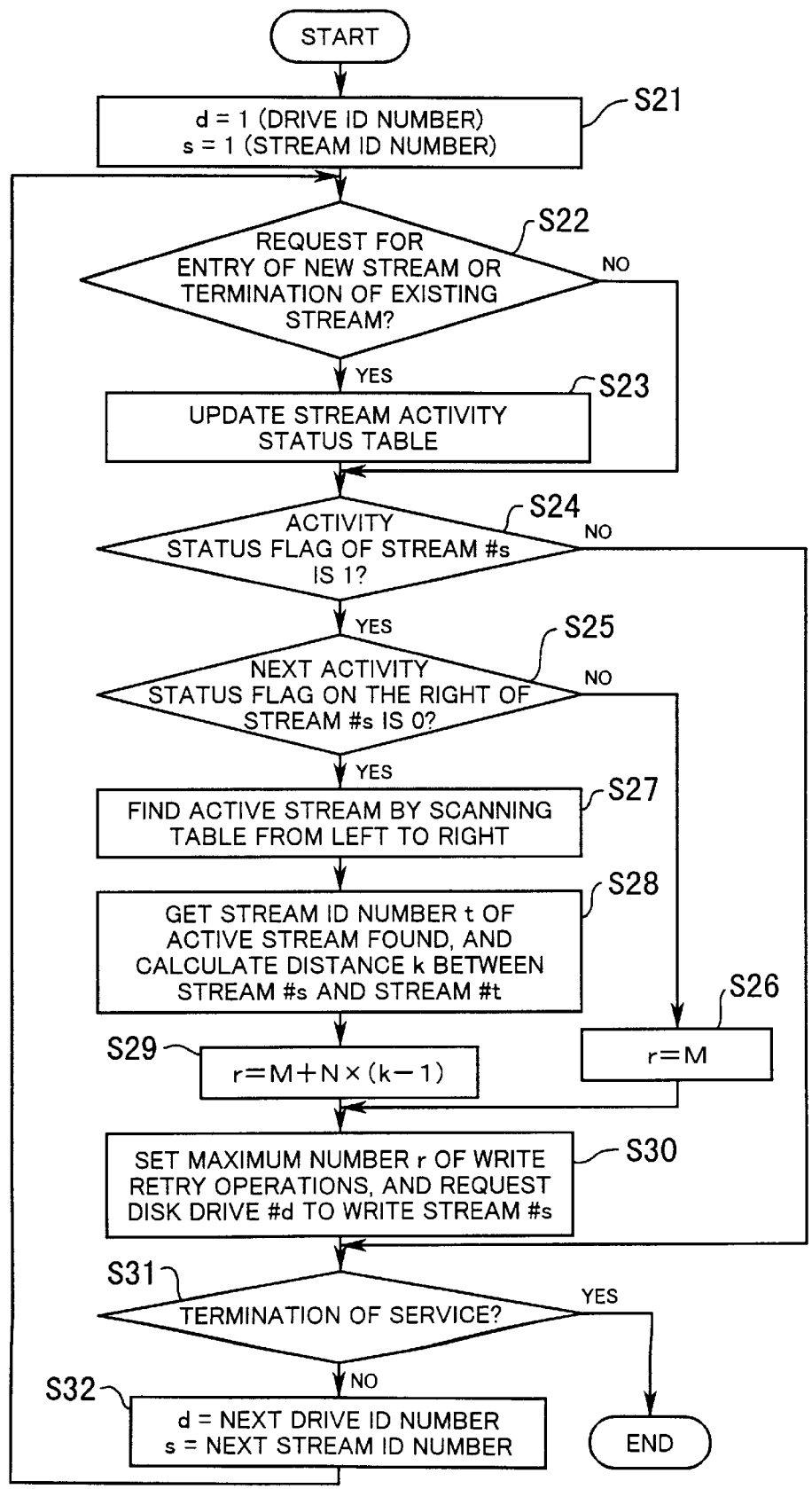
FIG. 9 is a flowchart which shows a process of writing data to disk drives.

FIG. 9 is a flowchart which shows a process of writing the video data into disk drives. This process is executed by the CPU 51 in accordance with the executive program that has been loaded in the memory 52 for the purpose of data access control.

(S21) The process first gives a value of "1" to a parameter named "d" that represents the identification number of a specific disk drive, as well as setting the same value "1" to another parameter named "s" that indicates the identification number of a specific stream to be processed.

(S22) It is examined whether there is a request for entry of a new stream #s or for termination of the existing stream #s. If such a request is present, the process advances to step S23. Otherwise, it skips to step S24.

(S23) The CPU 51 updates the contents of the stream activity status table. More specifically, when the entry of a new stream is requested, a stream status flag for the stream #s will be set to "1." When it is a request for termination of the existing stream #s, the corresponding stream activity status flag is reset to "0."

(S24) Referring to the stream activity status table, the CPU 51 checks whether the stream status flag of the stream #s is "1" or not. If the flag is "1," the process proceeds to step S25. If it is "0," then the process skips to step S31.

(S25) Referring again to the stream activity status table, the CPU 51 finds the next stream status flag at the right of the stream #s and checks whether it is "1" or "0." If the flag is "0," the process proceeds to step S27. If it is "1," then the process advances to step S26.

(S26) A variable "r" is introduced here as r=M, and the process advances to step S30.

(S27) By scanning the stream activity status table from left to right, the CPU 51 finds a stream whose stream status flag is set to "1." Suppose, for example, that the present value of s is 6 (i.e., the stream #6 is in process). The CPU 51 starts scanning the table from the second column (stream #6) and tests the next ones (i.e., streams #11, #2, and so on) by changing its scanning pointer from column to column, until it finds an entry having a status flag value of "1." When it has reached the right-most column of the stream activity status table, the pointer wraps around to the left-most column to continue the scan.

(S28) The stream ID number of the active stream found in step S27 is assigned to a variable "t," and another parameter "k" representing the distance between the stream #s and the stream #t is calculated in terms of the number of columns in the stream activity status table. When s=t, which implies that the stream #s is the only stream in service, the distance k will be equal to the maximum number of streams.

(S29) The CPU 51 calculates the value of $(M+N\times(k-1))$ and assigns the result to another variable "r," where M and N are constant-valued parameters analogous to those used in the data read operations described in the first embodiment of the present invention. That is, M is the number of write retry operations that can be conducted within the remaining period of an active time slot after the first write cycle of a given data block has finished. The constant N is the number of write retry operations that can be executed in a single vacant time slot.

(S30) The CPU 51 issues a write request command to the disk drive #d to write a data block of the stream #s, while allowing up to r cycles of write retry operations.

(S31) The CPU 51 examines whether the termination of the present service is requested or not. If there is such a request, the process aborts at that point in time, and otherwise, the process advances to the next step S32.

(S32) The variables d and s, which represent the present drive ID number and the present stream ID number, respectively, are updated so that they will point the next disk drive and the next stream. The process now returns to step S22.

In this way, the data access control system of the present invention finds vacant time slots and uses them, if available, for write retry operations. Conventional systems have no way of compensating for write errors, but in contrast to this, the proposed system makes it more likely that the given data will be completely written into disks by rewriting its erroneous portion.

The following section will now present a comparison between a conventional system and the system proposed in the present invention, referring to timing diagrams that illustrate data transfer operations in each system.

Figure 10:
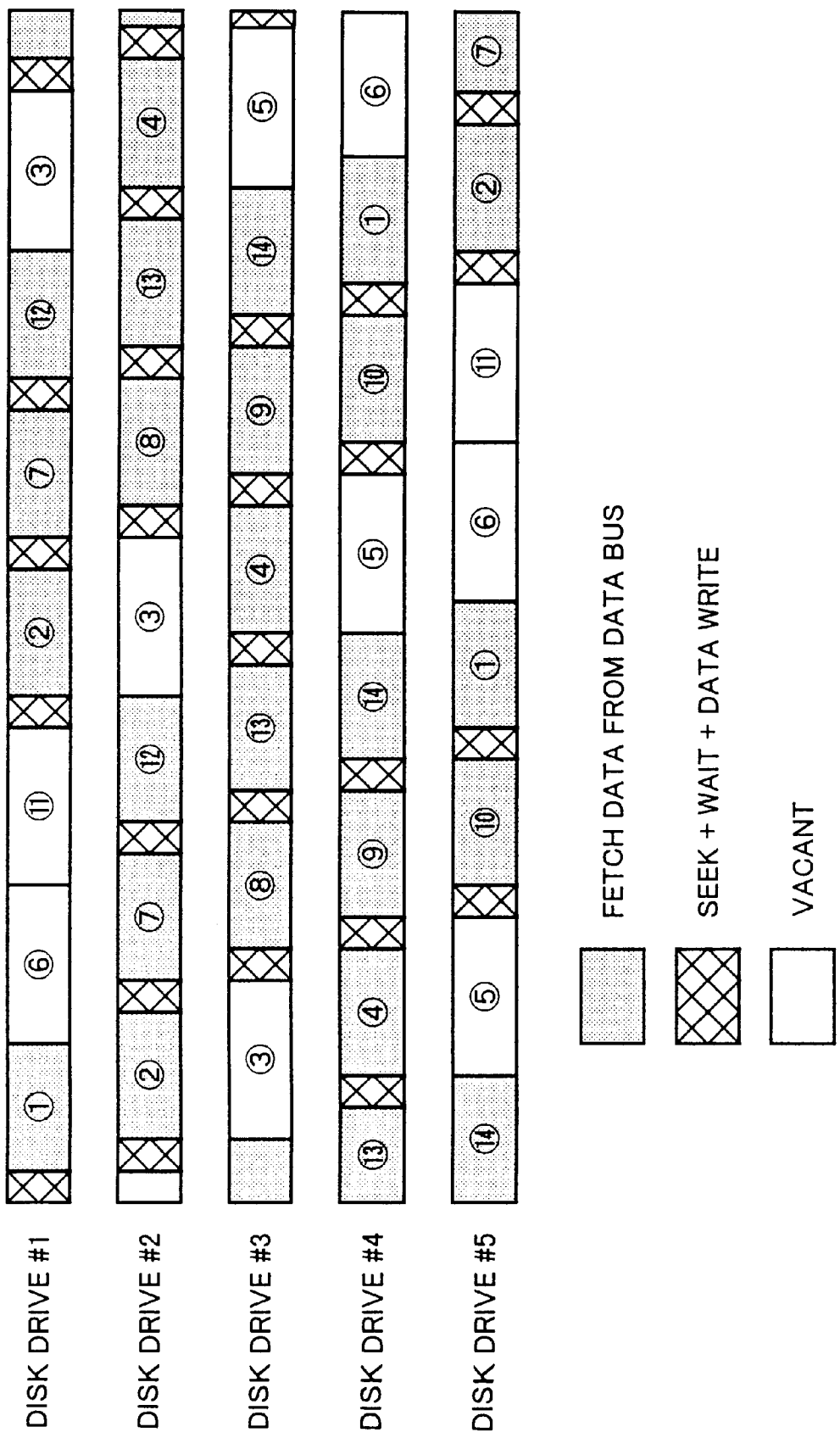
FIG. 10 is a timing diagram which shows conventional data write operations.

FIG. 10 is a timing diagram which shows conventional data write operations, where the number of activated streams is below the upper limit and some unused time slots are available. Concerning the legend of FIG. 10, the circled numerals represent the stream ID numbers assigned to fourteen streams, which is the largest number of concurrent data streams that the present system can produce. Among the time slots illustrated in FIG. 10, the blank time slots indicate that they are just vacant and have no data to write. In the present example, the time slots of streams #3, #5, #6, and #11 are vacant.

The data write operations are unlike the data read operations in that they occupy a different portion of a time slot to make a data bus transfer. More specifically, in a data read cycle, data is sent out to the data bus at the end of each time slot. In a data write cycle, on the other hand, data is fetched from the data bus at the beginning of each time slot.

Figure 11:
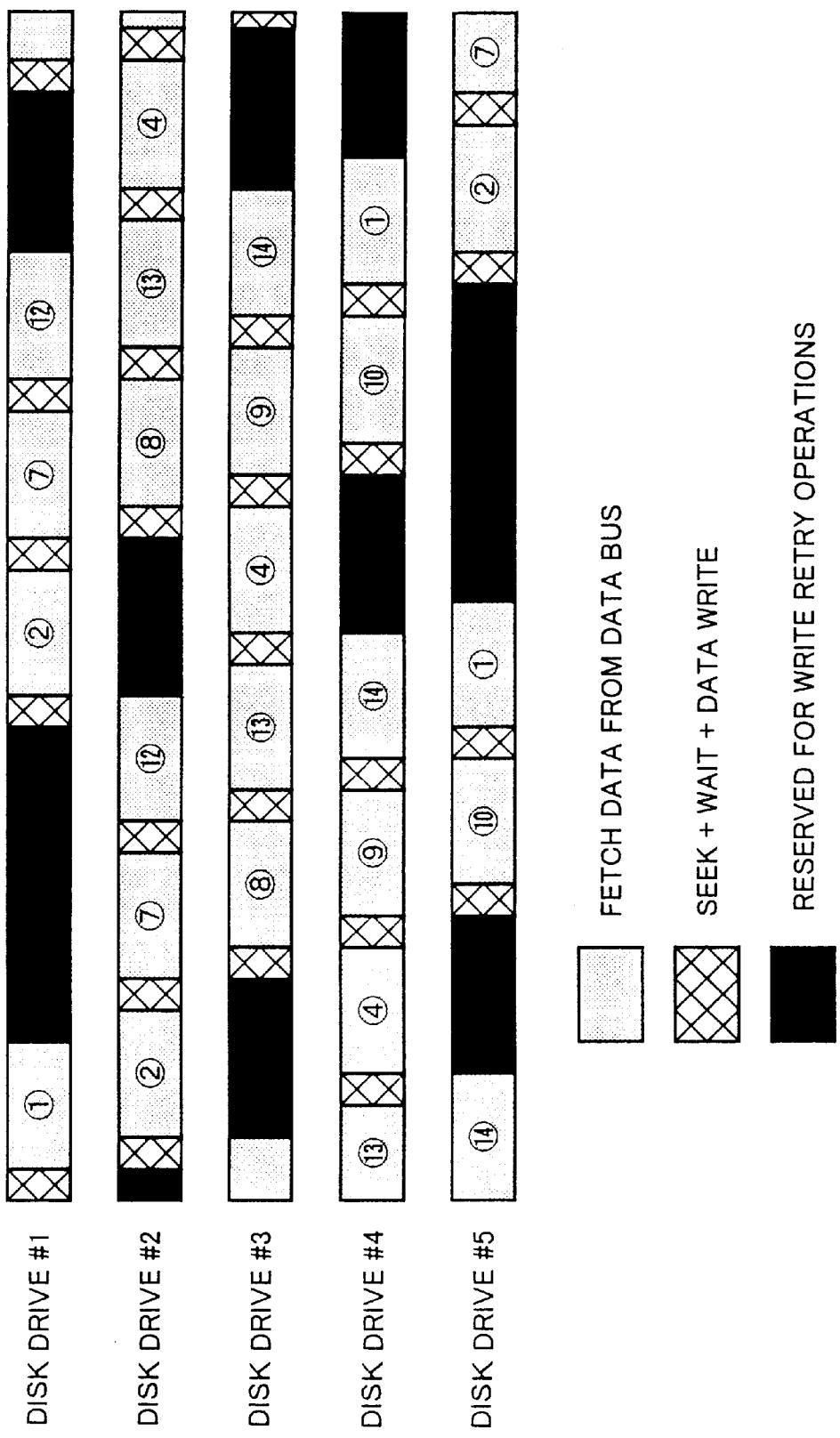
FIG. 11 is a timing diagram showing data write operations according to the present invention.
Figure 12:
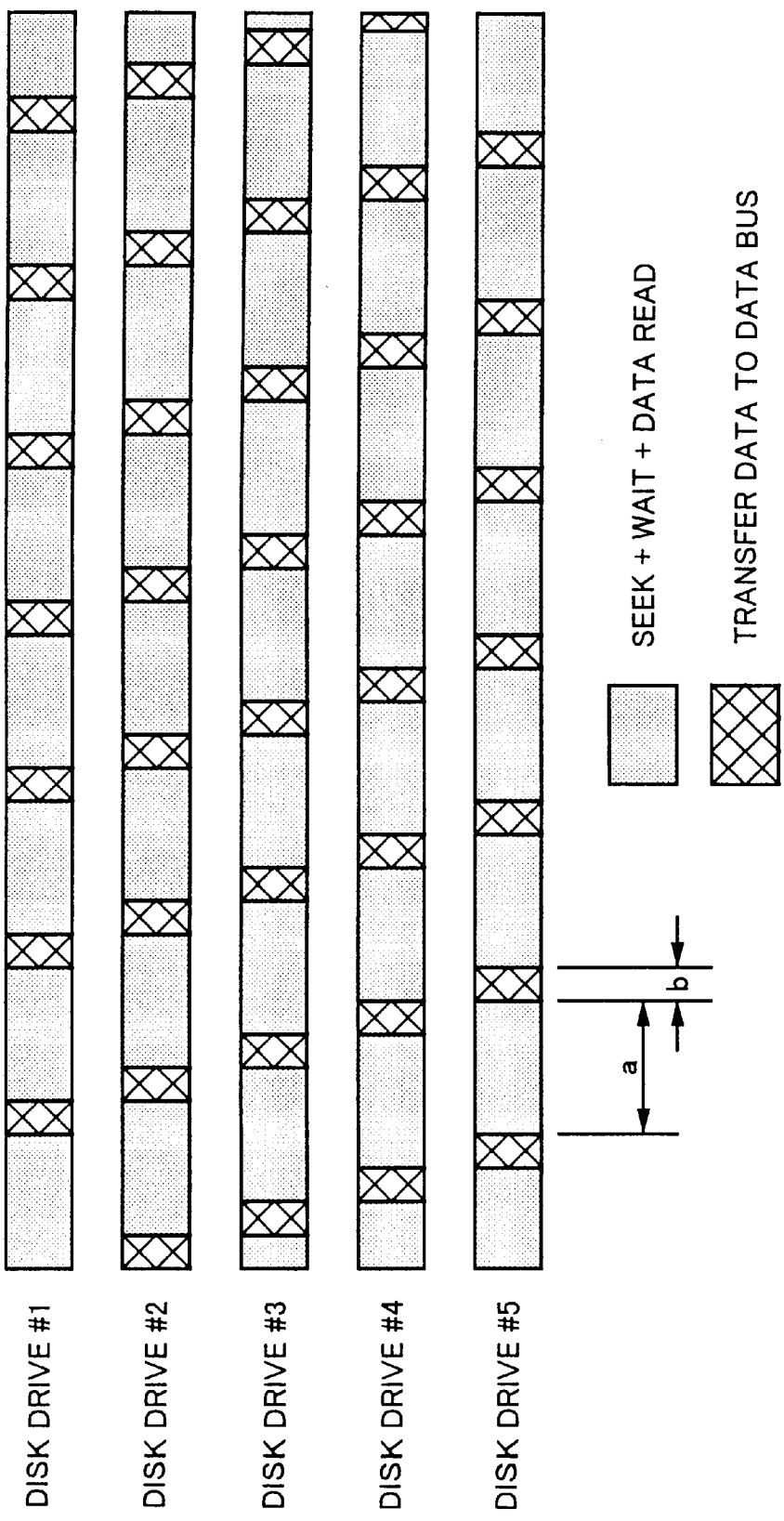
FIG. 12 is a diagram which shows conventional data read operations.

FIG. 11 is a timing diagram showing data write operations according to the present invention. FIG. 11 illustrates the same active streams as those in FIG. 10. Take the time slot #12 (more exactly, the time slot of stream #12) for example. It should be noted here that the time slot #3 just after the time slot #12 is not used at present, and therefore it is possible to make a write retry operation during this vacant time slot, if any write error is encountered in the time slot #12. This also applies to other time slots #1 and #14, and particularly in the former slot #1, it would be possible to spend two full slot intervals, if required, for retrying data write operations.

The foregoing sections have explained the present invention by illustrating two separate systems, one for data reading and the other for data writing. However, it is also possible to integrate those two into one system.

The proposed processing mechanisms are actually implemented as software functions of a computer system. The process steps of the proposed data access control systems are encoded in a computer program, which will be stored in a computer-readable storage medium. To realize the first and second embodiments of the present invention, there will be two kinds of programs: a first data access control program designed for data reading, and a second data access control program designed for data writing. It will be also possible to combine these two programs into a single package. The computer system executes such programs to provide the intended functions of the present invention.

The suitable computer-readable storage media include magnetic storage media and solid state memory devices. Some portable storage media, such as CD-ROMs and floppy disks, are also suitable for circulation purposes. Further, it will be possible to distribute the programs through an appropriate server computer deployed on a network. The program file delivered to a user is normally installed in his/her computer's hard drive or other local mass storage devices, which will be executed after being loaded to the main memory.

The above discussion will now be summarized as follows. The data access control system according to the first embodiment of the present invention is configured to conduct read retry operations in the event that a read error is encountered and if the storage units have some time to spare for extra read cycles. The retry operations are repeated until the data is successfully recovered, as long as time permits. This structural arrangement makes the system more resilient to read errors.

Further, the data access control system according to the second embodiment of the present invention is designed to perform write retry operations in the event that a write error is encountered and if the storage units have some time to spare for extra write cycles. The retry operations are repeated until the data is successfully stored, as long as time permits, thus making the system more resilient to write errors.

Moreover, the present invention proposes a computer-readable medium encoded with a first data access control program which makes a computer system execute read retry operations in the event that a read error has happened and if the storage units have some time to spare for extra data read cycles. The computer system makes access to the storage units until the data is successfully recovered from errors, as long as time permits.

Furthermore, the present invention proposes a computer-readable medium encoded with a second data access control program which makes a computer system execute write retry operations in the event that a write error has happened and if the storage units have some time to spare for extra data write cycles. The computer system makes access to the storage units until the data is successfully stored into them, as long as time permits.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A data access control system for sequentially reading out a plurality of data blocks from a plurality of storage units, and transferring each data block through a single data transmission channel within a scheduled output time period, the plurality of storage units being disposed on the single data transmission channel to store the plurality of data blocks in a distributed manner, the data access control system comprising:

vacancy monitoring means for finding a vacant time slot available in each of the storage units, the vacant time slot being a time period during which no data read operations are scheduled; and data read control means for finding a particular data block that is scheduled to be read out just after the vacant time slot detected by said slot vacancy monitoring means has expired, prefetching the particular data block during the vacant time slot, and if a read error is encountered during the prefetch of the particular data block, conducting read retry operations until the scheduled output time period comes.

2. The data access control system according to claim 1, wherein said vacancy monitoring means defines the time slot as an interval of time allocated for reading out one data block from the storage units and supplying the data block to the data transmission channel, and defines a maximum permissible period as the interval of the time slot multiplied by the number of consecutive time slots during which no data read operations are scheduled, and said data read control means repeats the read retry operations until the maximum permissible period expires.

3. The data access control system according to claim 2, wherein said vacancy monitoring means defines a stream as a resource allocated for making access to a series of data blocks, determines maximum number of streams that can be activated concurrently, assigns different time slots to the streams separately for each of the storage units, and determines, when one of the streams is found to be inactive at a given instant of time, that all the time slots assigned to the inactive stream are vacant.

4. The data access control system according to claim 3, wherein said vacancy monitoring means comprises a stream activity status table which is composed of a plurality of entries corresponding to the streams, said plurality of entries are arranged in the order of appearance of the time slots assigned to the streams, each of said plurality of entries contains a stream ID number and an activity status flag indicative of whether the corresponding stream is active or not, and said vacancy monitoring means examines each stream's activity status flag in the stream activity status table, and if the stream of interest is found to be inactive, makes a forward scan of the stream activity status table to count the entries until a next active stream is found, thereby obtaining the number of consecutive time slots in which no data read operation is scheduled.

5. A data access control system for transferring a plurality of data blocks to a plurality of storage units through a single data transmission channel, each within a scheduled time period, and sequentially writing the transferred data blocks into the plurality of storage units, the plurality of storage units being disposed on the single data transmission channel to allow the plurality of data blocks to be stored in a distributed manner, the data access control system comprising:

vacancy monitoring means for finding a vacant time slot available in each of the storage units, the vacant time slot being a time period during which no data write operations are scheduled; and data write control means for finding a particular data block that is scheduled to be written into the storage unit of interest just before the vacant time slot detected by said slot vacancy monitoring means, and executing write retry operations during the vacant time slot if a write error is encountered when writing the particular data block.

6. The data access control system according to claim 5, wherein said vacancy monitoring means defines the time slot as an interval of time allocated for writing one data block to the storage units and further defines a maximum permissible period as the interval of the time slot multiplied by the number of consecutive time slots during which no data write operations are scheduled, and said data write control means repeats the write retry operations until the maximum permissible retry period expires.

7. The data access control system according to claim 6, wherein said vacancy monitoring means defines a stream as a resource allocated for making access to a series of data blocks, determines maximum number of streams that can be activated concurrently, assigns different time slots to the streams separately for each of the storage units, and determines, when one of the streams is found to be inactive at a given instant of time, that all the time slots assigned to the inactive stream are vacant.

8. The data access control system according to claim 7, wherein said vacancy monitoring means comprises a stream activity status table which is composed of a plurality of entries corresponding to the streams, said plurality of entries are arranged in the order of appearance of the time slots assigned to the streams, each of said plurality of entries contains a stream ID number and an activity status flag indicative of whether the corresponding stream is active or not, and said vacancy monitoring means examines each stream's activity status flag in the stream activity status table, and if the stream of interest is found to be active and the stream at the right is found to be inactive, makes a forward scan of the stream activity status table to count the entries until a next active stream is found, thereby obtaining the number of consecutive time slots in which no data read operation is scheduled.

9. A computer-readable medium encoded with a data access control program for sequentially reading out a plurality of data blocks from a plurality of storage units, and for transferring each data block through a single data transmission channel within a scheduled output time period, the plurality of storage units being disposed on the single data transmission channel to store the plurality of data blocks in a distributed manner, the data access control program being designed to run on a computer in order to cause the computer to function as:

vacancy monitoring means for finding a vacant time slot available in each of the storage units, the vacant time slot being a time period during which no data read operations are scheduled; and data read control means for finding a particular data block that is scheduled to be read out just after the vacant time slot detected by said slot vacancy monitoring means has expired, prefetching the particular data block during the vacant time slot, and if a read error is encountered during the prefetch of the particular data block, conducting read retry operations until the scheduled output time period comes.

10. A computer-readable medium encoded with a data access control program for transferring a plurality of data blocks to a plurality of storage units through a single data transmission channel, each within a scheduled time period, and sequentially writing the transferred data blocks into the plurality of storage units, the plurality of storage units being disposed on the single data transmission channel to store the plurality of data blocks in a distributed manner, the data access control program being designed to run on a computer in order to cause the computer to function as:

vacancy monitoring means for finding a vacant time slot available in each of the storage units, the vacant time slot being a time period during which no data write operations are scheduled; and data write control means for finding a particular data block that is scheduled to be written into the storage unit of interest just before the vacant time slot detected by said slot vacancy monitoring means, and executing write retry operations during the vacant time slot if a write error is encountered when writing the particular data block.

* * * * *